United States Patent
Fisher et al.

(10) Patent No.: US 8,245,500 B2
(45) Date of Patent: Aug. 21, 2012

(54) DUAL CATALYST NOX REDUCTION SYSTEM FOR EXHAUST FROM LEAN BURN INTERNAL COMBUSTION ENGINES

(75) Inventors: Galen B. Fisher, Bloomfield Hills, MI (US); Craig L. DiMaggio, Troy, MI (US); Ken M. Rahmoeller, West Bloomfield, MI (US); Mark C. Sellnau, Bloomfield Hills, MI (US)

(73) Assignee: Delphi Technologies, Inc., Troy, MI (US)

(*) Notice: Subject to any disclaimer, the term of this patent is extended or adjusted under 35 U.S.C. 154(b) by 982 days.

(21) Appl. No.: 12/217,568

(22) Filed: Jul. 7, 2008

(65) Prior Publication Data

US 2010/0000202 A1    Jan. 7, 2010

(51) Int. Cl.
*F01N 3/20*    (2006.01)
(52) U.S. Cl. .............. 60/286; 60/295; 60/301
(58) Field of Classification Search .......... 60/286, 60/295, 301, 303
See application file for complete search history.

(56) References Cited

U.S. PATENT DOCUMENTS

| | | | |
|---|---|---|---|
| 6,057,259 A | 5/2000 | Miyadera et al. | |
| 6,284,211 B1 | 9/2001 | Miyadera et al. | |
| 2006/0228283 A1 | 10/2006 | Malyala et al. | |
| 2007/0033928 A1* | 2/2007 | Hu et al. | 60/286 |
| 2007/0059223 A1 | 3/2007 | Golunski et al. | |
| 2008/0066456 A1 | 3/2008 | Schmieg et al. | |
| 2008/0131345 A1* | 6/2008 | Vitse et al. | 423/239.1 |

FOREIGN PATENT DOCUMENTS

| | | |
|---|---|---|
| WO | WO2006/093802 | 2/2006 |
| WO | WO2008/067038 | 6/2008 |

* cited by examiner

*Primary Examiner* — Thomas Denion
*Assistant Examiner* — Jonathan Matthias
(74) *Attorney, Agent, or Firm* — Thomas N. Twomey

(57) ABSTRACT

A method and apparatus for reducing the percentage of nitrogen dioxide and nitrogen monoxide in an exhaust gas stream of an internal combustion engine, comprising the steps of injecting a hydrocarbon compound and optionally hydrogen into the exhaust gas stream; passing the exhaust gas through a first catalyst for selective reduction of a portion of the nitrogen oxides to nitrogen, ammonia, and N-containing species; passing the exhaust gas through a second catalyst for selective reduction of a portion of the nitrogen oxides with ammonia to molecular nitrogen; sensing ammonia concentration in the exhaust gas stream after passage through either or both of the first and second catalysts; and controlling by a controller in a feedback loop the injecting to an amount of hydrocarbon that will produce a predetermined concentration of ammonia and nitrogen oxides at the sensor that will lead to high NOx conversion.

23 Claims, 4 Drawing Sheets

DUAL CATALYST NOX REDUCTION SYSTEM FOR EXHAUST FROM LEAN BURN INTERNAL COMBUSTION ENGINES

TECHNICAL FIELD

The present invention relates to means for reducing emissions from internal combustion engines; more particularly, to methods and apparatus for reducing engine emissions of nitrogen oxides (NOx); and most particularly, to a dual catalyst system for reducing NOx to $N_2$ in lean-burn engines without the use of platinum group metals (PGM) in the catalysts.

BACKGROUND OF THE INVENTION

Internal combustion engines, and diesel engines in particular, are known to emit oxides of nitrogen under various operating conditions. Emissions limits promulgated by the US Federal government are stringent and are projected to become even more so. Accordingly, it is of great interest to engine and vehicle manufacturers to develop strategies for continuous removal of NOx from the exhaust streams of engines and to match those emission control strategies to the range of combustion modes possible in such engines.

One such engine control strategy comprises operating an engine at an air/fuel ratio that is lean of stoichiometry to improve fuel economy and reduce greenhouse gas emissions. Such operation is possible using compression-ignition (diesel) and lean-burn spark-ignition engines. When an engine operates with a lean (excess oxygen) air/fuel ratio, the resultant combustion temperature is lower, leading to decreased engine-out NOx emissions; however, commercial application of lean-operating engines is limited due to lack of effective methods to remove NOx under a lean exhaust condition. Thus, efficient reduction of nitrogen oxides ($NOx=NO+NO_2$) from diesel and lean-burn gasoline exhaust is important to meet future emission standards and improve vehicle fuel economy.

Reduction of NOx emissions from an exhaust feedstream containing excess oxygen is a challenge for vehicle manufacturers. By way of example, it has been estimated that compliance with Bin 5 regulations in the United States may require an aftertreatment system capable of 70-90% NOx conversion efficiency on the FTP (Federal Test Procedure) cycle based on currently anticipated engine-out NOx levels. For practical applications, the conversion efficiency must be obtained at a low temperature operating range (e.g., 200-350° C.) occurring during the aforementioned FTP cycle and at a higher temperature operating range (e.g., 450-550° C.) occurring during a high speed test cycle (e.g., US06 Federal Test Procedure).

Several potential aftertreatment systems have been proposed for vehicle applications. One approach comprises using an aftertreatment system including injecting a NOx reductant, e.g., urea, upstream of an urea-SCR catalyst to form ammonia, thereby to reduce NOx to $N_2$ and water. Use of urea as a reductant necessitates a urea storage and distribution infrastructure and an on-vehicle monitoring system for this secondary fluid, and may have potential problems in cold weather climates due to the relatively high freezing point (−12° C.) of the urea solution and deposits that can form in the exhaust at low temperatures.

NOx storage catalysts typically require large catalyst volumes, large amounts of PGM or other precious metals, and low sulfur fuel for efficient storage operation. Such systems also require periodic catalyst regeneration involving fuel injection to generate high exhaust gas temperatures and injection of reductants such as $H_2$ or hydrocarbon fuel to regenerate the storage material of the catalyst.

Selective Catalytic Reduction (SCR) of NOx using hydrocarbons (HC-SCR) has been studied extensively as a potential alternative method for the removal of NOx under oxygen-rich conditions. Ion-exchanged base metal zeolite catalysts (e.g., Cu-ZSM5) have typically not been sufficiently active under typical vehicle operating conditions, and are susceptible to degradation by sulfur dioxide and water exposure. Catalysts employing platinum-group metals (e.g., $Pt/Al_2O_3$) operate effectively over only a narrow temperature window and are highly selective towards $N_2O$ production.

Making $NH_3$ in a rich or reducing exhaust is relatively easy because $NH_3$ is a reducing species. However, as noted above, making $NH_3$ in lean or oxidizing exhaust is difficult but possible with an appropriate catalyst. $NH_3$ usually reacts with oxygen but a few catalysts will allow ammonia and other N-containing species to survive. Catalytic devices using alumina-supported silver ($Ag/Al_2O_3$) have received attention because of their ability to selectively reduce NOx under lean exhaust conditions with a wide variety of hydrocarbon species. (Since the price of silver historically has been less than 1/100 that of platinum, silver is not considered to be a precious metal in our discussion here.)

The use of partially-oxidized hydrocarbons (e.g., alcohols) over $Ag/Al_2O_3$ allows reduction of NOx at lower temperatures. However, such reductants typically are unavailable on-board a vehicle. In other prior art approaches HC-SCR over $Ag/Al_2O_3$ catalysts utilize light hydrocarbons (e.g., propene, propane) and heavier fuel-component hydrocarbons (e.g., octane, decane) as a reductant. NOx reduction using lighter hydrocarbons already present as the combustion products in engine exhaust yields conversion at higher temperatures, but for $Ag/Al_2O_3$ catalysts to be considered as candidates for practical use, the NOx reduction must be shifted to a lower temperature region and the fuel on-board the vehicle must be used as the reductant.

U.S. Pat. Nos. 6,057,259 and 6,284,211 disclose high percentage conversion of NO to $N_2$ over silver catalyst with ethanol as the reductant. Ammonia and other N-containing species are disclosed as exiting the silver catalyst and may be removed by a second catalyst including an $NH_3$-SCR catalyst.

World Patent No. WO 2006/093802 and Published US Patent Application No. 2006/0228283 disclose combining a Ag HC-SCR catalyst with a range of other catalysts, including $NH_3$-SCR catalysts, to give higher NOx conversion than either catalyst separately. Ammonia is cited as one species exiting the Ag catalyst.

Published US Patent Application No. 2007/0059223 discloses the combination of a Ag HC-SCR catalyst with another HC-SCR or partial oxidation catalyst to achieve high NOx reduction efficiency. The Ag catalyst uses ceria as an additive and the disclosure explicitly includes HC injection in the system.

Published US Patent Application No. 2008/0066456 A1, the relevant portions of which are incorporated herein by reference, discloses control of NOx emissions from a silver catalyst by controlling the HC/NOx ratio and level of $H_2$. There is no disclosure of a second $NH_3$-SCR catalyst or ammonia.

The prior art does not disclose to deliberately increase the amount of ammonia produced in a first catalyst, nor to control the amount of ammonia and other N-containing species formed with HC and/or $H_2$ in a first catalyst, nor to combine such control with an ammonia/$NO_2$/NO sensor, as is partially the subject of the present invention.

What is needed in the art is an inexpensive and effective method and apparatus to selectively reduce NOx in an exhaust gas feedstream for vehicles and other applications of lean-burn internal combustion engines.

It is a principal object of the present invention to reduce the size, complexity, and cost of a continuously-operable high-efficiency NOx abatement system using only non-platinum group metals.

SUMMARY OF THE INVENTION

Briefly described, in accordance with an embodiment of the present invention, there is provided a method and dual-catalyst apparatus to selectively reduce NOx emissions of a lean-burn internal combustion engine, including an exhaust aftertreatment system comprising an HC-SCR NOx catalyst, preferably a silver-alumina catalyst or one that is largely composed of silver, and a means to put reductants (e.g., hydrocarbons, hydrogen, etc.) into the exhaust upstream of the HC-SCR NOx catalyst by use of an injector, post-injection, EGR loop, or other devices. A control system is adapted to determine a ratio of NO and/or $NO_2$ to $NH_3$ gases in the exhaust gas feedstream exiting the HC-SCR NOx catalyst, and based upon that ratio to dispense hydrocarbon or other reductant, preferably engine fuel and preferably diesel fuel vapor, into the exhaust gas feedstream upstream of the HC-SCR NOx catalyst to augment any amount of ammonia indigenous to the exhaust gas feedstream. A preferred $NO/NH_3$ process aim for exhaust gas exiting the HC-SCR NOx catalyst is a ratio value near 1:1. The method further comprises optionally and selectively dispensing hydrogen in addition to the hydrocarbon reductant into the exhaust gas feedstream upstream of the silver-alumina catalytic reactor. The HC-SCR NOx catalyst converts all or most of the hydrocarbon reductant and a high percentage of the NOx into $N_2$, $NH_3$, other N-containing species and oxidation products in the presence of oxygen.

Downstream of the HC-SCR NOx catalyst is a second, non-precious metal $NH_3$-SCR catalyst for receiving the partially-treated exhaust gas feedstream and converting NOx (both residual NO and $NO_2$) and $NH_3$ into $N_2$ and water in the presence of oxygen.

A dual catalyst system in accordance with the present invention requires no precious metals and is capable of eliminating about 95% of the NOx load over a wide range of lean-burn operating temperatures.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

To meet the needs and competitive issues discussed above, an aftertreatment system in accordance with the present invention combines NOx species (NO and $NO_2$), produced by combustion processes, with fuel HCs (e.g., diesel fuel, gasoline, E85, or other fuels) and optionally $H_2$ over a dual catalyst system to reduce NOx to nitrogen. (Diesel or "heavy" HCs as used herein means largely aliphatic hydrocarbons that are normally liquids at room temperature.) The source of the HCs can be from injection of reductants (e.g., fuel vapor) directly into the exhaust pathway, post injecting into the firing chamber in the combustion cycle which leaves larger HCs intact in the exhaust, or as the normal products of advanced premixed combustion modes. The object of the invention is to reduce tailpipe NOx levels to meet present and future emissions standards.

Figure 1:
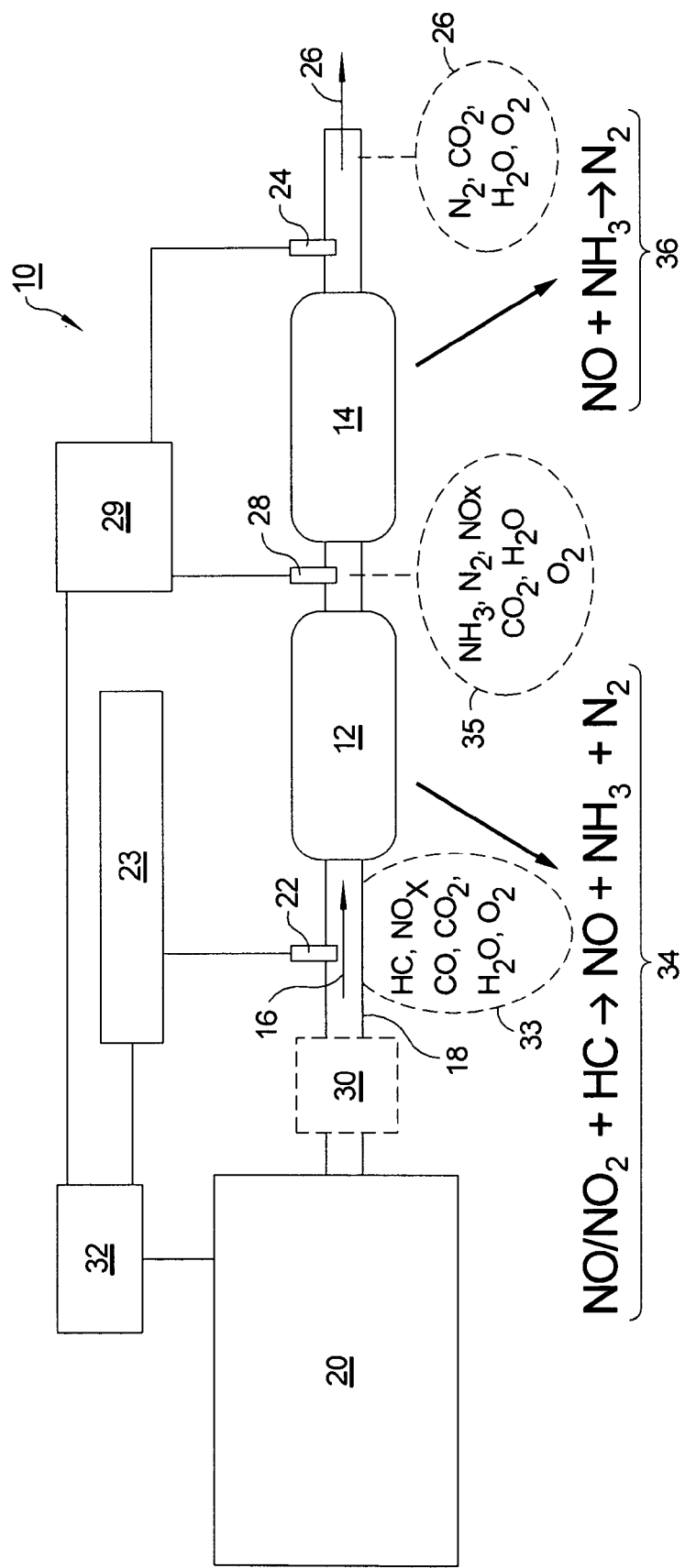
FIG. 1 is a schematic view of a dual catalyst system in accordance with the present invention for reducing NOx in lean burn engine exhaust.

Referring to FIG. 1, a low cost dual-catalyst NOx reduction system 10 in accordance with the present invention comprises a first HC—NOx catalyst 12 and a second $NH_3$-SCR catalyst 14 in series in an exhaust gas flowstream 16 flowing in an exhaust pipe 18 from a lean-burn internal combustion engine 20. System 10 further comprises an injector 22 ahead of first catalyst 12 for injecting a hydrocarbon, preferably engine fuel and most preferably diesel engine fuel vapor, into flowstream 16. Optionally, gaseous hydrogen also may be injected. A first sensor 24 is disposed in exhaust gas flowsteam 16 after second catalyst 14 to monitor amounts of NOx and/or $NH_3$ in the treated exhaust gas flowstream 26. Optionally, a second sensor 28 may be disposed in exhaust gas flowstream 16 between the first and second catalysts 12,14 for monitoring amounts of $NH_3$ and/or NOx. Optionally, a diesel oxidizing catalyst and diesel particulate filter 30 (DOC/DPF) may also be disposed in the exhaust gas flowstream 16 ahead of first catalyst 12. Other sensors, such as exhaust temperature sensors, engine temperature sensors, and engine speed sensors, as are commonly known in the prior art but not shown herein, may also be included in the control scheme described below. A system controller 32 programmed with appropriate control algorithms and catalyst performance data controls the injection rate of hydrocarbon fuel and/or hydrogen at injector 22 via an injector controller 23 in a closed loop control system responsive to signals from first sensor 24 and/or second sensor 28 via sensor controller 29 to control the rate of formation of ammonia (and other N-containing species such as nitrites and isocyanates) in first catalyst 12. The system controller 32 may also control the post-injection of fuel, the EGR function, or other devices that would lead to increased amounts of HC or $H_2$ in the exhaust in front of catalyst 12. Thus, the exhaust gas mixture 33 entering first catalyst 12 typically comprises engine combustion products NOx, CO, $CO_2$, $H_2O$, and some unburned HC. In addition, a lean-burn engine will have substantial $O_2$ in its exhaust. Additional HC is added via injector 22.

First catalyst 12 is preferably an HC-SCR catalyst that reduces NOx to $N_2$, $NH_3$, (N-species), and unreacted NO (item 34). An example of such a catalyst is silver washcoated onto a substrate of alumina ($Ag/Al_2O_3$). Such catalysts are commercially available, and the present invention is not related to the formulation of this catalyst, but to its use under specific controlled operating conditions. A HC-SCR reduction catalyst requires excess $O_2$, hydrocarbons such as diesel fuel, NO and/or $NO_2$, and preferably a small amount of $H_2$ to improve low temperature light-off of the catalyst, thereby broadening the temperature range and effectiveness of catalytic activity. The exhaust gas 16 exiting first catalyst 12 is a mixture 35 comprising mainly $NH_3$ (and other N-containing species), $N_2$, NOx, $CO_2$, $H_2O$, and $O_2$.

First catalyst 12 has several functions. First, under appropriate temperatures, it converts NOx species directly into a combination of nitrogen (e.g., ~60%), $NH_3$ and other N-containing species (e.g., ~20%), and NO (e.g., ~20%) by reaction with long chain hydrocarbons found in or added to the exhaust. Adding small amounts of $H_2$ is also known in the prior art to improve low temperature performance of this catalyst. It is desirable to have the highest possible NOx conversion efficiency in first catalyst 12, but this catalyst is never 100% efficient.

Second, this catalyst acts as an oxidation catalyst by reacting exhaust HCs with oxygen to form CO, $CO_2$, and $H_2O$. This function is important because it prevents large HCs from reaching the second catalyst 14 and poisoning it.

Third, this catalyst reacts well with $NO_2$, so that the main exiting NOx species is NO, inhibiting the potential downstream formation of ammonium nitrate at low temperatures. However, by using appropriate amounts of HC (and $H_2$), catalyst 12 can be made to produce desired levels of $NH_3$ (and other N-species) needed for optimal operation of second catalyst 14.

A simplified and unbalanced equation for reactions over the first catalyst 12 is:

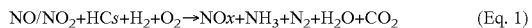

$$NO/NO_2 + HCs + H_2 + O_2 \rightarrow NOx + NH_3 + N_2 + H_2O + CO_2 \quad (Eq. 1)$$

Second catalyst 14 is an ammonia-SCR (or urea-SCR) catalyst that reacts the $NH_3$ (and other N-species) and NOx exiting first catalyst 12 to further improve the total NOx conversion to $N_2$ (item 36) in the following simplified and unbalanced reaction:

$$NO + NH_3 O_2 \rightarrow N_2 + H_2O \quad (Eq. 2)$$

Thus, the exhaust flowstream 26 exiting tailpipe 18 comprises $N_2$, $CO_2$, $H_2O$, and $O_2$.

The second catalyst may be either vanadia-based or zeolite-based. Both iron-based zeolite (Fe/zeolite) and copper-based zeolite (Cu/zeolite) catalysts are suitable choices, and all of these zeolites are commercially available. Other zeolites having such catalytic activity are comprehended by the present invention. Under oxidizing conditions, second catalyst 14 reacts the $NH_3$ (and other N-species) and NO/NOx exiting the first catalyst to form nitrogen, further reducing the overall concentration of NOx in the exhaust by as much as 90% from its original concentrations, below projected future emissions requirements.

The second catalyst 14 requires excess $O_2$ (hence lean-burn engine exhaust), no heavy HCs which reversibly poison the zeolite catalyst, and optimally about equal amounts of NOx and $NH_3$ (1:1 mole ratio).

Excellent control may be obtained with the use of a sensor 28 that measures $NH_3$ and/or $NO_2$ and/or NO that is placed between the HC-SCR and $NH_3$-SCR catalysts. A pure $NH_3$ sensor (not currently available in the art) would be especially useful in controlling the amount of HC and/or $H_2$ to inject into the exhaust stream. Measurement of NOx components is useful for knowing how much more reductant is required to reach desired NOx levels. A sensor that measures $NH_3$ and/or $NO_2$ and/or NO can be placed downstream of both catalysts 12,14 for diagnostics as well as control. Control algorithms are designed to provide appropriate amounts of HC and other reductants from the engine, the EGR loop, or by injection into the exhaust to optimize NOx performance, especially with $NH_3$ generation in first catalyst 12.

An important aspect of the present invention is that by controlling the amount of hydrocarbon and hydrogen in the incoming exhaust flow to first catalyst 12, the amount of ammonia and other nitrogen-containing species being made in this catalyst can be controlled. Data representative of what can be done with various amounts of hydrocarbon and hydrogen are shown in the results of bench catalyst testing (FIGS. 2 and 3) wherein the HC/NOx ratio is changed for two different values of $H_2$ (0% and 1%) in the exhaust flowstream 16 entering first catalyst 12.

Figure 2:
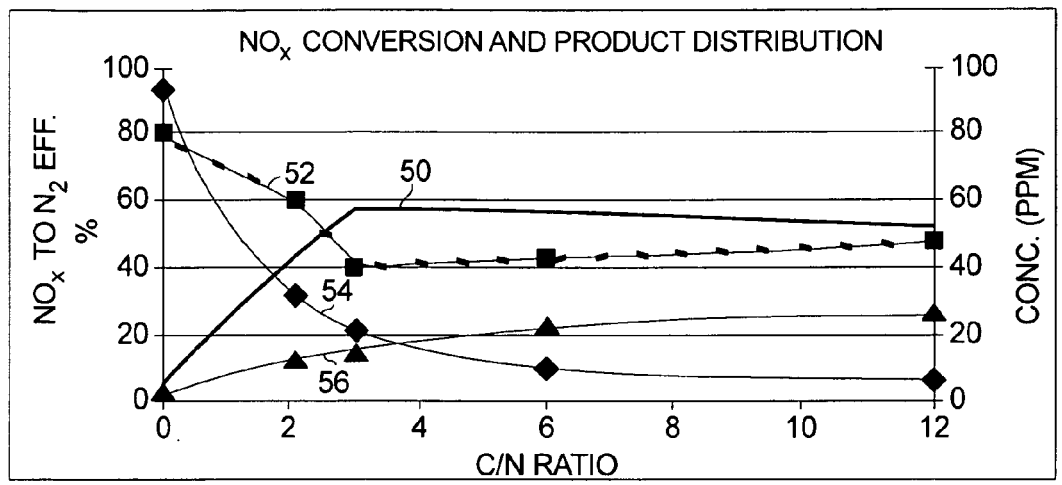
FIG. 2 is a family of graphs showing activity in a first HC-SCR NOx catalyst device as a function of carbon/nitrogen ratio in a simulated lean burn engine exhaust having 0% $H_2$.
Figure 3:
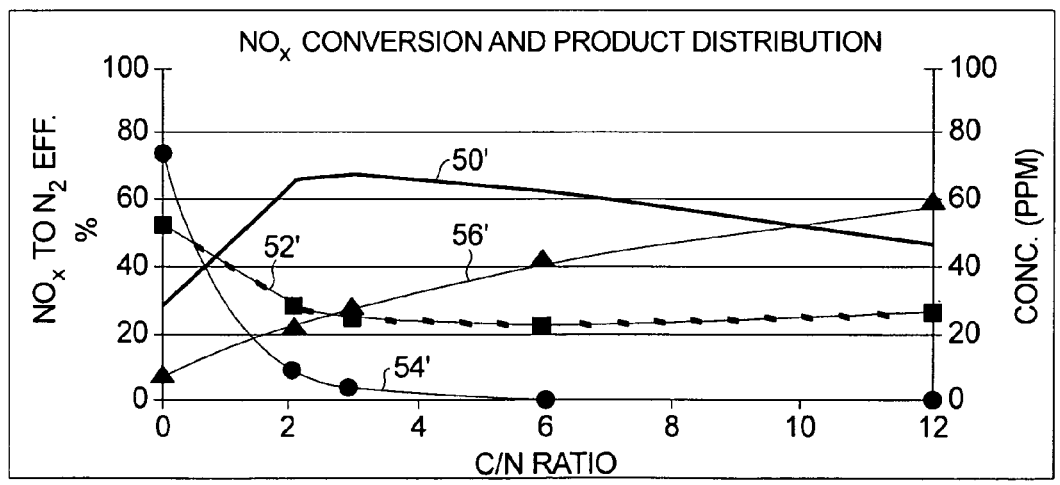
FIG. 3 is a family of graphs similar to those shown in FIG. 2 wherein the simulated lean burn engine exhaust includes 1% $H_2$.

FIGS. 2 and 3 show NOx conversion in catalyst 12 as a function of hydrocarbon injection by injector 22, expressed as the carbon/nitrogen ratio, $C_1/N$, with dodecane ($C_{12}H_{26}$) as the variable source of carbon. Test conditions were at 300° C. An artificial "exhaust" mixture comprising dodecane plus 8% $O_2$, 6% $H_2O$, 140 ppm propane, and a 180 ppm 1:1 mixture of $NO/NO_2$ was flowed through system 10. In FIG. 2, no $H_2$ is present in the gas mixture. FIG. 3 shows the same test but with 1% $H_2$ added.

In FIG. 2, it is seen that without $H_2$, NOx conversion to $N_2$ (curve 50) increases rapidly with increasing C/N ratio to just under 60% conversion at about C/N=3. NO (curve 52) is minimized at 40% and $NO_2$ concentration (curve 54) is reduced by 75% at the same C/N ratio.

In FIG. 3, it is seen that with 1% $H_2$, NOx conversion to $N_2$ (curve 50') increases even more rapidly with increasing C/N ratio to nearly 70% conversion at about C/N=3. NO (curve 52') is minimized at about 25% and $NO_2$ concentration (curve 54') is reduced to essentially zero at the same C/N ratio. The ratio of NO (curve 52') to NH3 (curve 56') for C/N=3 is nearly 1:1.

Figure 4:
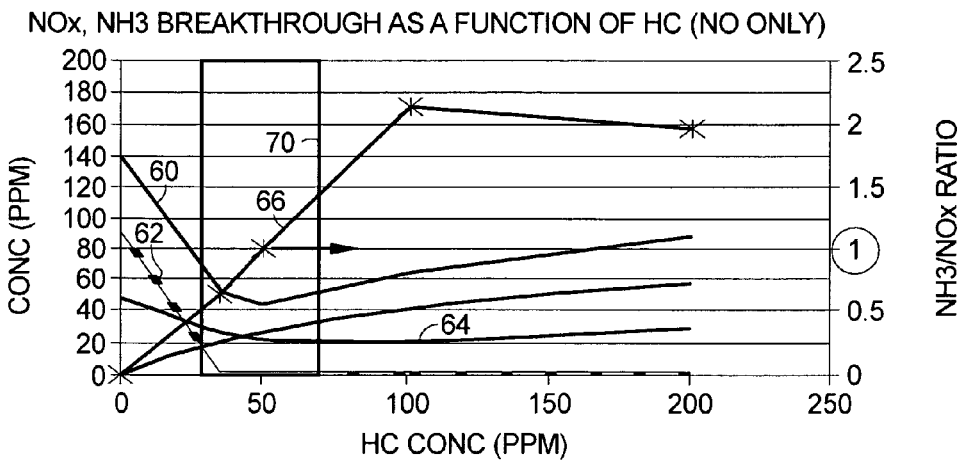
FIG. 4 is a family of graphs showing activity in a first HC-SCR NOx catalyst device as a function of hydrocarbon concentration in a simulated lean burn engine exhaust.

FIG. 4 presents the data from FIG. 3 in a slightly different way, as a function of hydrocarbon concentration. It is seen that total nitrogen from NOx and $NH_3$ (curve 60) (i.e., non-$N_2N$ species) exiting first catalyst 12 decreases rapidly with increasing HC concentration, shown by the essential disappearance (curve 62) of $NO_2$ and significant reduction in NO (curve 64) by about 30 ppm HC. At 50 ppm HC, the $NH_3/NOx$ ratio (curve 66) is 1.0. Increasing the HC concentration above about 50 pmm serves only to increase the formation of $NH_3$ with only minor further decrease in NO, and is increasingly wasteful of HC fuel. A control box 70 defines a preferred operating range of about 25 ppm to about 75 ppm for addition for hydrocarbon fuel to exhaust stream 16 in the simulated exhaust experiment described above. In an actual engine, a similar optimum HC addition amount may be readily determined from feedback from sensor 24 and/or sensor 28 (FIG. 1) in known fashion. Controller 32 may then control on that optimal value as a control setpoint for injection of HC and $H_2$ into exhaust gas flowstream 16.

FIG. 4 shows clearly that the amount of $NH_3$ made within first catalyst 12 can be controlled by controlling the amount of HC and $H_2$ that is used in the input. What makes this attractive is that with an $NH_3$-SCR catalyst 14 downstream of the Ag catalyst 12, any unreacted NOx from the first catalyst will react with the $NH_3$ and other N-species produced in the first catalyst and improve the overall efficiency of the system.

Thus, a dual SCR system in accordance with the present invention can achieve high conversions of NOx to $N_2$ at very low cost, without the necessity of using platinum-group metals such as platinum, palladium, or rhodium in either of catalyst devices 12,14 as is typically required in comparable prior art NOx abatement systems.

Figure 5:
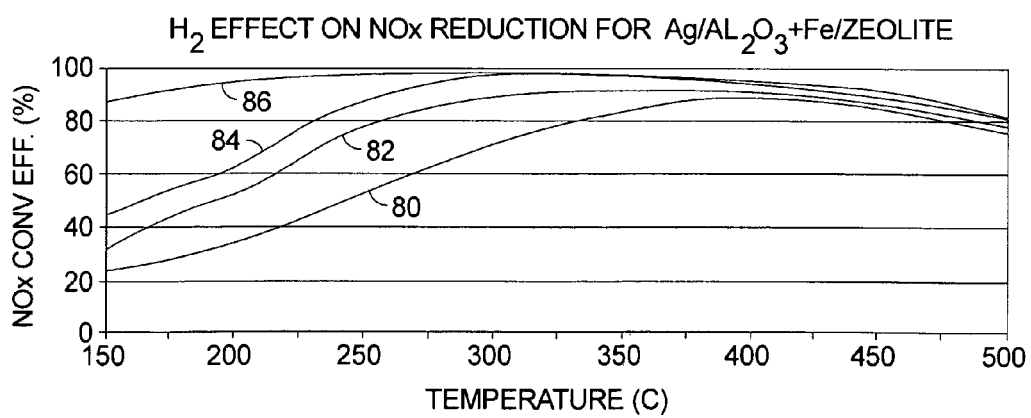
FIG. 5 is a family of graphs showing the benefit of adding hydrogen to the engine exhaust before the first catalyst.

Referring to FIG. 5, the low-temperature catalytic benefit of adding small amounts of hydrogen to the pre-treatment exhaust is shown. Curve 80 represents 0% $H_2$ addition; curve 82 represents 0.1% $H_2$; curve 84 represents 0.25% $H_2$; and curve 86 represents 1.0% $H_2$. Addition of 1% hydrogen causes catalyst 12 to be highly active at temperatures as low as 150°, which is a common diesel exhaust temperature. Thus, the addition of hydrogen, although optional, is a preferred embodiment of the present invention.

Figure 6:
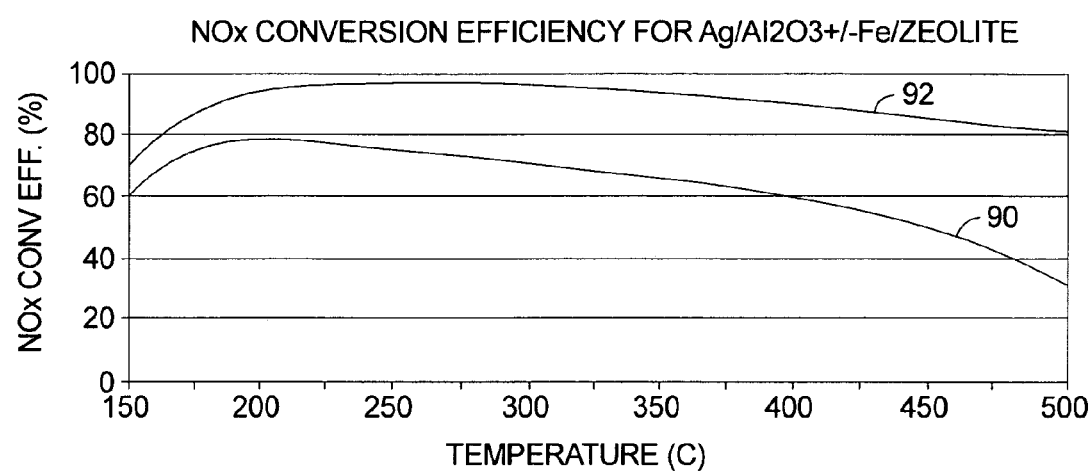
FIG. 6 is a pair of graphs showing the benefit of adding a zeolite second catalyst to the system after a first silver/alumina catalyst.

Referring to FIG. 6, the NOx conversion benefit of treating the output of HC-SCR first catalyst 12 with a zeolite second catalyst 14 in accordance with the present invention is shown. Curve 90 represents the output of first catalyst 12 only, over a temperature range from 150° C. to 500° C. The simulated exhaust in the test comprises HC=dodecane, C/N=3. NOx=200 ppm, CO=350 ppm, $O_2$=8%, $CO_2$=4%, $H_2O$=6%; and propane=140 ppm. It is seen that NOx conversion does not exceed 70%. However, a second NH3-SCR catalyst 14 of, for example, a zeolite exchanged with Cu or Fe should improve performance. In fact, in this case when an iron zeolite is coupled to first catalyst 12 (curve 92), the total NOx-to-$N_2$ conversion is high over a wide temperature range and can be as great as 96%.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for reducing the percentage of nitrogen dioxide and nitrogen monoxide in an exhaust gas stream of an internal combustion engine, comprising:
    a) a first catalyst for selective reduction of a portion of said nitrogen oxides to nitrogen and ammonia;
    b) a second catalyst for selective reduction of a portion of said nitrogen oxides and said ammonia to molecular nitrogen;
    c) an injector upstream of said first catalyst for injecting at least a hydrocarbon compound into said exhaust gas stream;
    d) a sensor disposed downstream of at least one of said first and second catalysts for sensing concentration of at least ammonia in said exhaust gas stream after passage of said exhaust gas stream through said at least one of said first and second catalysts; and
    e) a programmed controller in communication in a feedback loop with said sensor and said injector for injecting an amount of said hydrocarbon that will produce a predetermined concentration of ammonia and nitrogen oxides at said sensor according to an algorithm programmed into said controller.

2. A system in accordance with claim 1 wherein said first catalyst also oxidizes hydrocarbons to carbon monoxide and carbon dioxide and water.

3. A system in accordance with claim 1 wherein said internal combustion engine is equipped for lean-burn operation and provides free molecular oxygen in said exhaust gas stream.

4. A system in accordance with claim 1 wherein said first catalyst comprises silver and alumina.

5. A system in accordance with claim 1 wherein said second catalyst is selected from the group consisting of vanadia and a zeolite.

6. A system in accordance with claim 5 wherein said zeolite is selected from the group consisting of iron zeolite and copper zeolite.

7. A system in accordance with claim 1 wherein said sensor is disposed in said exhaust gas stream after said first catalyst.

8. A system in accordance with claim 1 wherein said sensor is disposed in said exhaust gas stream after said second catalyst.

9. A system in accordance with claim 8 wherein said sensor is a first sensor, and wherein a second sensor is disposed between said first and second catalysts.

10. A system in accordance with claim 9 wherein at least one of said first and second sensors is sensitive to ammonia, nitrogen monoxide, and nitrogen dioxide.

11. A system in accordance with claim 1 wherein said injector is adapted to inject molecular hydrogen into said exhaust gas stream, and wherein said controller is programmed for injecting predetermined amounts of said molecular hydrogen in response to signals received from said sensor.

12. A system in accordance with claim 1 wherein said hydrocarbon concentration in said exhaust gas stream is adjusted to a predetermined value.

13. A system in accordance with claim 12 wherein said predetermined value will produce an ammonia-to-nitrogen oxides concentration ratio between about 0.1 and about 2.0 in said exhaust gas stream after said first catalyst.

14. A system in accordance with claim 13 wherein a target concentration ratio is about 1.0.

15. A system in accordance with claim 12 wherein said predetermined value will produce a carbon-to-nitrogen concentration ratio between about 1 and about 9 in said exhaust gas stream before entering said first catalyst.

16. A system in accordance with claim 1 wherein said hydrocarbon is selected from the group consisting of diesel fuel, biodiesel, gasoline, E85, and E100.

17. A system in accordance with claim 1 wherein said internal combustion engine is selected from the group consisting of spark-ignited and compression-ignited, including those engines capable of pre-mixed low temperature diesel combustion.

18. A system in accordance with claim 1 wherein all of said exhaust gas stream passes through said first catalyst and said second catalyst.

19. An internal combustion engine comprising a system for reducing the percentages of nitrogen dioxide and nitrogen monoxide in an exhaust gas stream of an internal combustion engine, including
    a first catalyst for selective reduction of a portion of said nitrogen oxides to nitrogen and ammonia;
    a second catalyst for selective reduction of a portion of said nitrogen oxides and said ammonia to molecular nitrogen;
    an injector upstream of said first catalyst for injecting at least a hydrocarbon compound into said exhaust gas stream;
    a sensor disposed downstream of at least one of said first and second catalysts for sensing concentration of at least ammonia in said exhaust gas stream after passage of said exhaust gas stream through said at least one of said first and second catalysts; and a programmed controller in communication in a feedback loop with said sensor and said injector for injecting an amount of said hydrocarbon that will produce a predetermined concentration of ammonia and nitrogen oxides at said sensor according to an algorithm programmed into said controller.

20. A method for reducing the percentage of nitrogen dioxide and nitrogen monoxide in an exhaust gas stream of an internal combustion engine, comprising the steps of:

a) injecting at least a hydrocarbon compound into said exhaust gas stream;

b) passing said injected exhaust gas stream through a first catalyst for selective reduction of a portion of said nitrogen dioxide to nitrogen monoxide and ammonia;

c) passing said injected exhaust gas stream through a second catalyst for selective reduction of a portion of said nitrogen monoxide and ammonia to molecular nitrogen and water;

d) sensing at least ammonia concentration in said injected exhaust gas stream after passage of said injected exhaust gas stream through said at least one of said first and second catalysts; and e) controlling said injecting to an amount of said hydrocarbon that will produce a predetermined concentration of ammonia and nitrogen oxides at said sensor.

21. A method in accordance with claim 20 comprising the further step of injecting an amount of molecular hydrogen into said exhaust gas stream ahead of said first catalyst.

22. A method in accordance with claim 20 wherein said injected amounts of hydrocarbon and molecular hydrogen produce an ammonia-to-nitrogen oxides concentration ratio with a target of about 1 to 1 in said injected exhaust gas stream after said first catalyst.

23. A method in accordance with claim 20 wherein all of said exhaust gas stream passes through said first catalyst and said second catalyst.

* * * * *